US012631877B2

(12) United States Patent
Hejda et al.

(10) Patent No.: US 12,631,877 B2
(45) Date of Patent: May 19, 2026

(54) LCD DISPLAY UNIT FOR USE IN A REFLECTION DISPLAY SYSTEM IN A MOTOR VEHICLE, AND REFLECTION DISPLAY SYSTEM

(71) Applicant: Bayerische Motoren Werke Aktiengesellschaft, Munich (DE)

(72) Inventors: Tomas Hejda, Neufahrn (DE); Armin Wagner-Gentner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 118 days.

(21) Appl. No.: 18/698,835

(22) PCT Filed: Jul. 29, 2022

(86) PCT No.: PCT/EP2022/071435
§ 371 (c)(1),
(2) Date: Apr. 5, 2024

(87) PCT Pub. No.: WO2023/066539
PCT Pub. Date: Apr. 27, 2023

(65) Prior Publication Data
US 2025/0244578 A1 Jul. 31, 2025

(30) Foreign Application Priority Data

Oct. 22, 2021 (DE) ..................... 10 2021 127 555.5

(51) Int. Cl.
*G02B 27/01* (2006.01)
*B60K 35/234* (2024.01)
(Continued)

(52) U.S. Cl.
CPC ........ *G02B 27/0101* (2013.01); *B60K 35/234* (2024.01); *G06T 3/18* (2024.01);
(Continued)

(58) Field of Classification Search
CPC .... G09G 3/002; G09G 3/3426; G09G 3/3648; G09G 2380/10; B60K 2360/23; B60K 2360/349
See application file for complete search history.

(56) References Cited

U.S. PATENT DOCUMENTS

| | | | |
|---|---|---|---|
| 11,378,799 B1* | 7/2022 | Gu ......................... | B60K 35/23 |
| 2013/0050533 A1* | 2/2013 | Park ..................... | G06Q 10/109 |
| | | | 345/619 |

(Continued)

FOREIGN PATENT DOCUMENTS

| | | |
|---|---|---|
| CN | 112285933 A | 1/2021 |
| DE | 10 2009 054 231 A1 | 5/2011 |

(Continued)

OTHER PUBLICATIONS

English translation of JP 2020098270 A (Year: 2020).*

(Continued)

*Primary Examiner* — Grace Q Li
(74) *Attorney, Agent, or Firm* — Crowell & Moring LLP

(57) ABSTRACT

An LCD display unit for a reflection display system in a motor vehicle includes an LCD pixel matrix for selectively controlling picture elements for presenting a display image on a display area; a backlight arrangement, which is divided into selectively controllable dimming zones in order to illuminate regions containing multiple picture elements with background light; and a control unit, which is configured to control the LCD pixel matrix so that the display image is output, the display image being distorted using a warping function in order to compensate for a distortion of the display image as a result of reflection from a reflection region. The dimming zones have a shape and a size determined by the warping function.

10 Claims, 3 Drawing Sheets

(51) Int. Cl.

| | |
|---|---|
| *G06T 3/18* | (2024.01) |
| *G09G 3/00* | (2006.01) |
| *G09G 3/34* | (2006.01) |
| *G09G 3/36* | (2006.01) |

(52) U.S. Cl.
CPC ........... *G09G 3/002* (2013.01); *G09G 3/3426* (2013.01); *G09G 3/3648* (2013.01); *B60K 2360/23* (2024.01); *B60K 2360/349* (2024.01); *G02B 2027/0121* (2013.01); *G09G 2320/0626* (2013.01); *G09G 2320/0686* (2013.01); *G09G 2380/10* (2013.01)

(56) References Cited

U.S. PATENT DOCUMENTS

| | | | | |
|---|---|---|---|---|
| 2022/0180821 | A1* | 6/2022 | Hsieh | G09G 3/36 |
| 2023/0096807 | A1* | 3/2023 | Yang | G02F 1/133612 |
| | | | | 349/56 |

FOREIGN PATENT DOCUMENTS

| | | | | |
|---|---|---|---|---|
| GB | 2576064 | A | | 2/2020 |
| JP | 2020-98270 | A | | 6/2020 |
| JP | 2020098270 | A | * | 6/2020 |
| JP | 2020-112667 | A | | 7/2020 |

OTHER PUBLICATIONS

International Search Report (PCT/ISA/210) issued in PCT Application No. PCT/EP2022/071435 dated Nov. 23, 2022 with English translation (5 pages).

German-language Written Opinion (PCT/ISA/237) issued in PCT Application No. PCT/EP2022/071435 dated Nov. 23, 2022 with English translation (7 pages).

German-language Search Report issued in German Application No. 10 2021 127 555.5 dated Apr. 28, 2022 with partial English translation (14 pages).

* cited by examiner a)

b)

LCD DISPLAY UNIT FOR USE IN A REFLECTION DISPLAY SYSTEM IN A MOTOR VEHICLE, AND REFLECTION DISPLAY SYSTEM

BACKGROUND AND SUMMARY

The invention relates to reflection display systems, in particular panorama head-up displays (PHUDs), and in particular to measures for the energy-efficient operation of reflection display systems with reduced ghost images.

In reflection display systems, a display image of a display surface of a display unit is imaged over a reflective surface. In motor vehicles, they are implemented on the top side of the dashboard, with the result that the display image is reflected at a reflection surface of the windshield and are thus perceived in the eye region of the vehicle occupants. The vehicle occupants then look at the windshield where they perceive the reflected display image.

Owing to the curvature of the windshield, the display image of the display unit is not imaged precisely like the original, but is generally curved or distorted and changed in terms of its dimensions. In order to correctly present the distortion and the aspect ratio in the display image perceived via the reflection surface, the output display image on the display surface of the display unit is distorted. This process is called warping. The display image shown on the display surface therefore typically has a banana-shaped contour, which corresponds to the optical effects of the curvature of the windshield.

Since LCD display units generally have only a finite contrast, objects presented in the perceived display image are surrounded by a gray region which, in the case of a non-distorted display image of the display unit, is recognizable as a banana-shaped area. This area corresponds to the entire displayable region of the perceived display image. When warping is applied, the gray region is rectangular and images the dimensions of the display surface. The area of the gray region surrounding objects to be displayed are perceived as bothersome especially at twilight and in darkness.

It is therefore the object of the invention to provide an LCD display unit which reduces the surface regions perceived as a gray region in the display image in a bothersome manner and additionally reduces the energy consumed by the LCD display unit.

This object is achieved by the claimed LCD display unit for a motor vehicle and by a reflection display system according to the claimed invention.

According to a first aspect, an LCD display unit for use in a reflection display system in a motor vehicle is provided, comprising an LCD pixel matrix for selectively controlling image points for presenting a display image on a display surface, a backlight arrangement, which is divided into selectively controllable dimming zones in order to light regions having a plurality of image points with backlight when image points are presented therein, a control unit, which is designed to control the LCD pixel matrix such that the display image is output which is distorted with the aid of a warping function in order to compensate for a distortion of the display image due to reflection at a reflection region, wherein the dimming zones have a shape and size that are determined by the warping function.

Using a matrix backlight arrangement in the LCD display unit can help avoid that the regions of the display image that are intended to be presented as black appear as gray regions by virtue of the fact that the backlighting of the backlight arrangement is deactivated for regions that do not contain active image points. In particular, the matrix backlight arrangement provides for the division of the display surface into what are known as dimming zones and the activation of only that/those dimming zone(s) in which at least one non-black image point is to be displayed. As a result, the surface regions in the perceived display image which are to be presented completely in black but are perceivable as a gray region due to the finite contrast of LCD display units are reduced.

Owing to the curvature of the windshield, the display image which the vehicle occupant is intended to perceive is curved or distorted with the aid of a warping function and changed in terms of its dimensions. The display image displayed on the display surface therefore typically has a banana-shaped contour, which corresponds to the optical effects of the curvature of the windshield and of the arrangement angle of the windshield in relation to the display surface of the display unit.

In addition, the dimming zones which typically have a rectangular shape are modified in terms of shape and size in a manner such that they are distorted in correspondence with the warping or the underlying warping function. In this way, the activation and selection of dimming zones for distorted display images to be displayed can be better adapted to the distorted display image. It is possible in this way to reduce the gray region which is perceived in the perceived display image and surrounds the actively presented image points of the display image.

The modification of the shape and size of the dimming zones of the backlight arrangement can be implemented, proceeding from a division of the perceived display image into for example mutually adjoining rectangular display fields, on the basis of the warping function which is also used for the distortion of the display image for display on the LCD display device. As a result, the dimming zones of the LCD display device according to embodiments of the invention generally do not have square and rectangular areas, but zones which are curved specifically for the application and in each case likewise tend to be banana-shaped or shaped like a ring segment.

These dimming zones are then distorted in a reflection display system by the reflection in the reflection region of the windshield and thus presented as rectangular display regions or gray regions. The background of this procedure is that the display images which are typically to be presented are oriented based on a display surface which is divided for example into rectangles in order to keep the number of dimming zones to be activated as low as possible in an energy-efficient manner.

Provision may be made for the dimming zones of the backlight arrangement to each have an area and distribution that depend on display images to be displayed, wherein the display images to be displayed are preferably aligned with a horizontal and/or vertical axis of the display surface and are formed in particular as rectangular symbols or rectangular display fields which are selectively displayable.

The dimming zones of the backlight arrangement can thus be varied in terms of size and in particular provided such that the area of the dimming zones is smaller in regions in which frequently active image points are present than in regions in which active image points occur with a reduced frequency.

Furthermore, the LEDs of the dimming zones can be formed with a collimation optical unit in order to direct the light from the backlight arrangement in a preferred direction. In this way, the light from the backlight arrangement in a reflection display system can be directed into the respective eyebox of the vehicle occupants, in particular of the driver.

Furthermore, the dimming zones can be formed such that they adjoin one another, with the result that the display surface of the LCD pixel matrix on which a display image is to be presented is fully lightable.

Provision may be made for the shape of the dimming zones to be distorted with the aid of the warping function in each case proceeding from a rectangular shape, in particular proceeding from a rectangular shape of different sizes.

According to a further aspect, a reflection display system for a motor vehicle is provided, comprising the above-mentioned LCD display unit, a windshield with a reflection region which is curved in its surface.

Embodiments will be explained in more detail below with reference to the attached drawings.

DETAILED DESCRIPTION OF THE DRAWINGS

Figure 1A:
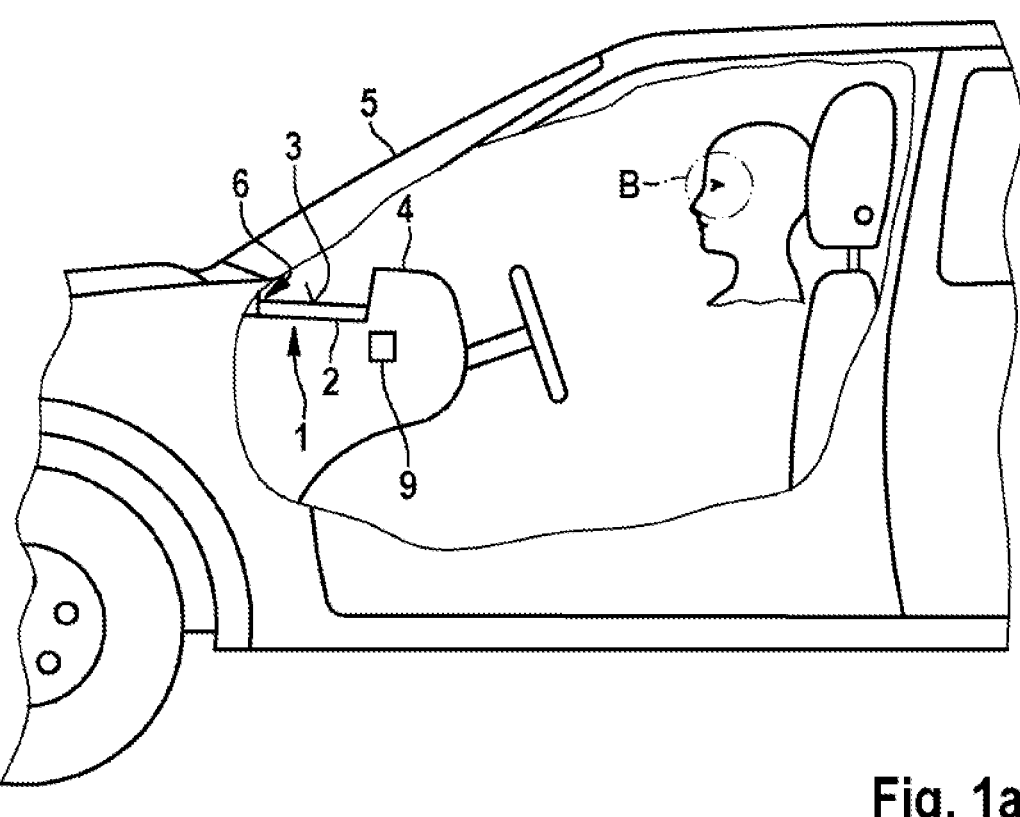
FIGS. 1a and 1b show a schematic cross-sectional illustration through a motor vehicle with a reflection display system or an internal-view illustration of the motor vehicle.
Figure 1B:
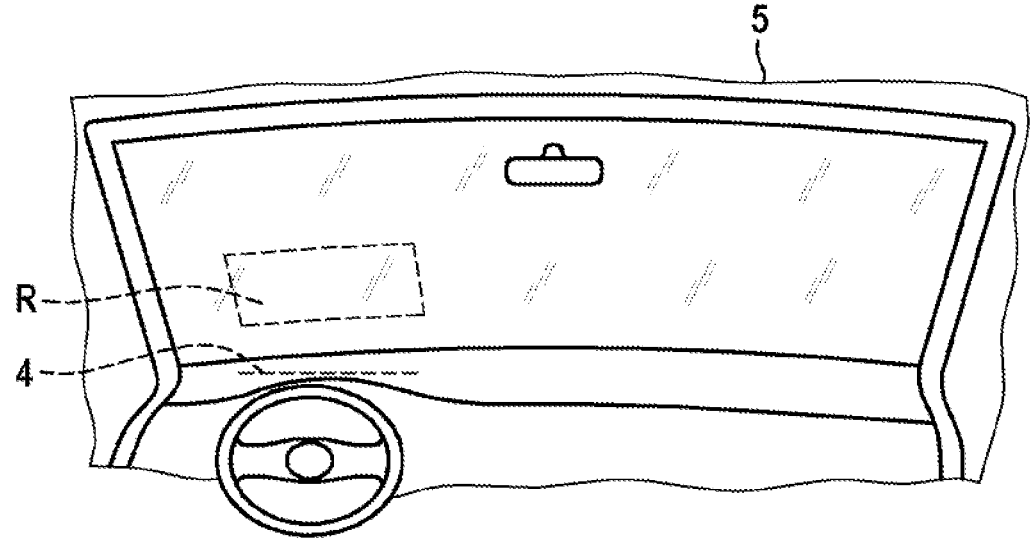

FIGS. 1a and 1b show a schematic cross-sectional illustration through a motor vehicle with a reflection display system 1 and an illustration from the viewing angle of the driver of the motor vehicle. The reflection display system 1 is arranged on a top side of an instrument panel 4 and has a display unit 2 which comprises a display surface 3 for presenting a display image. The display unit 2 is arranged on the top side of the instrument panel 4 below a windshield 5.

The display surface 3 is oriented relative to the windshield 5 such that a display image displayed on the display surface 3 of the display unit 2 is reflected at a lower region of the inside of the windshield 5, in a reflection region R, and can be perceived as a reflected image by a vehicle occupant in an eye region B. The orientation of the display unit 2 or of its display surface 3 is consequently preferably substantially parallel to the vehicle longitudinal axis and vehicle lateral axis or deviates therefrom by an angle of no more than 0-20°.

The display unit 2 is controlled by a control unit 9 to output a display image such that a corresponding display image can be perceived by the vehicle occupant. The control unit 9 can be designed to control the display unit 2 such that a display image which is distorted with the aid of a warping function is displayed. Proceeding from a display image to be perceived, the warping function is used to apply an image distortion function, which is then inverted again by the reflection at the generally curved reflection region R, with the result that the vehicle occupants perceive the original display image to be perceived.

The display unit 2 is mounted in a recess 6 in the instrument panel, with the result that the vehicle occupant cannot look directly at the display surface 3 of the display unit 4 and dazzling of the vehicle occupants due to direct light from the display surface 3 into the eye region B is avoided.

The display unit 2 is preferably designed as a light-emitting display unit, in particular as an LCD display unit with a backlight of high brightness, in order to provide a highly luminous display image, with the result that the reflected image generated can be perceived via the corresponding region of the windshield 5 even at high ambient brightness.

Figure 2:
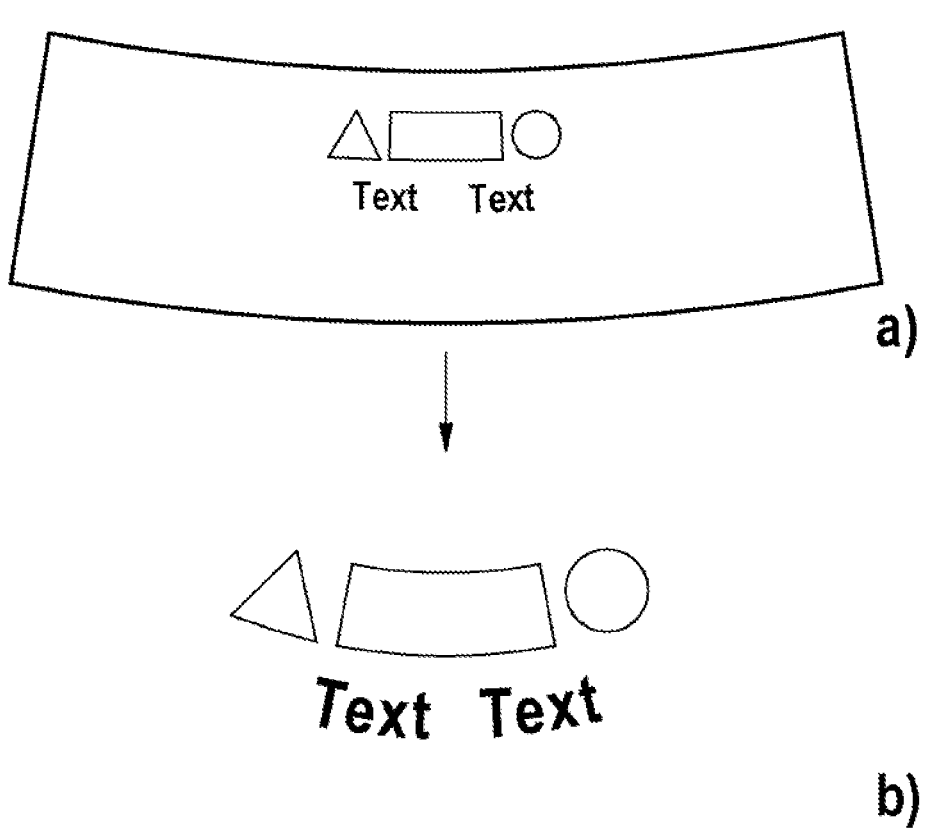
FIGS. 2a and 2b show an illustration of an output display image and of a perceived display image.

Since the windshield 5 and the reflection region R generally have a curvature, it is necessary for using the inside of the windshield 5 as the reflection surface that the displayed display image of the display unit 2 be distorted so that it can be perceived without distortion by the vehicle occupant. FIG. 2a shows by way of example a display image as it is to be perceived by the vehicle occupant, and FIG. 2b shows a display image which is output via the display surface of the LCD display unit.

Proceeding from the generally rectangular display image to be perceived in the example of FIG. 2a, a warping function is applied which distorts the display image to be displayed according to the example in FIG. 2b. The warping function generally causes the distortion of a display image that is to be presented substantially as rectangular into a banana-shaped distortion in order to compensate for the curvature of the windshield 5 in the lateral direction and height direction.

Figure 3:
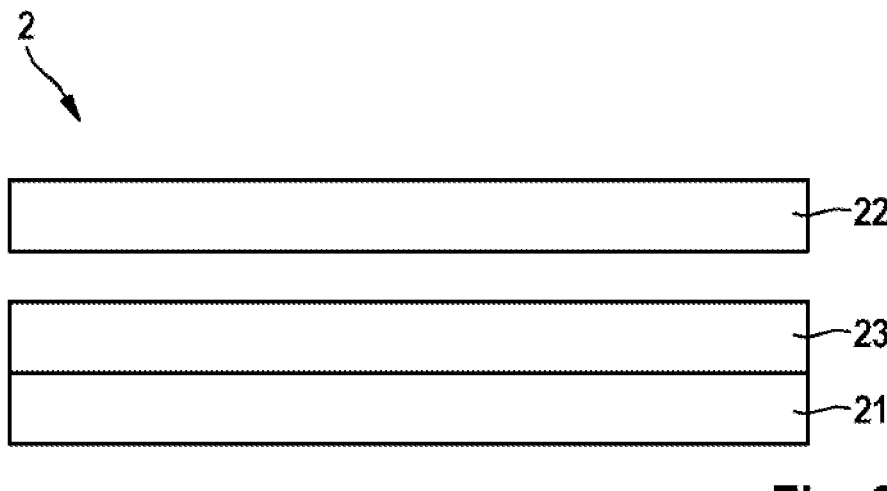
FIG. 3 shows a cross-sectional illustration of an LCD display device with a backlight arrangement.

FIG. 3 shows in cross section the schematic setup of an LCD display unit 2 with a two-dimensional backlight arrangement 21 and, arranged thereon, a two-dimensional LCD pixel matrix 22. The backlight arrangement 21 can be provided with a collimation optical layer 23 in order to direct the backlight emitted by the backlight arrangement into a preferential direction such that the display image is directed in particular into the eye region B of the vehicle occupant.

Figure 4:
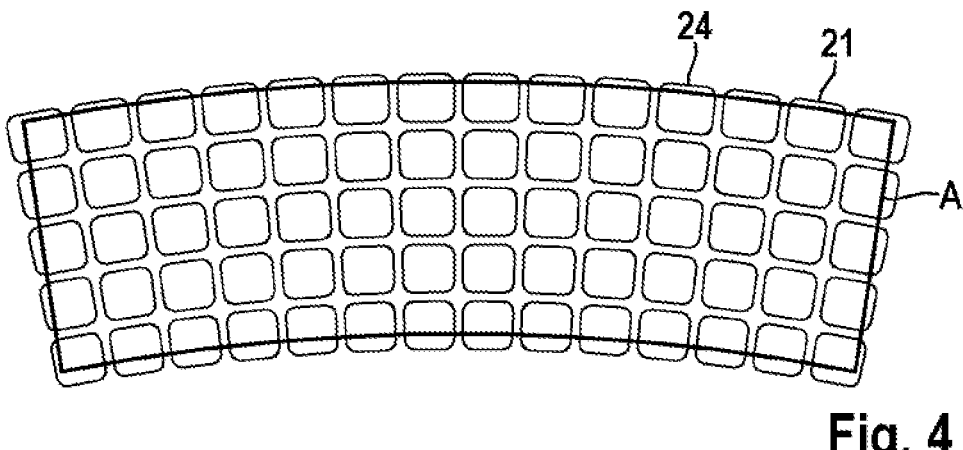
FIG. 4 shows an exemplary illustration of a backlight arrangement with dimming zones which are embodied so as to be distorted according to a warping function to be applied.

As shown in FIG. 4, the backlight arrangement 21 has dimming zones 24 which adjoin one another in the manner of segments such that the entire area of the backlight arrangement 21 is fully lightable. The dimming zones 24 are separately controllable so that it is possible to set their brightnesses. It is also possible for dimming zones 24 to be completely deactivated, so that no backlight is output. No bothersome gray region is produced in the region of deactivated dimming zones 24. The dimming zones 24 each have one or more LEDs, which are provided with a collimation optical layer 23 each in order to emit the backlight in a direction-dependent manner.

For use in a reflection display system 1 in a motor vehicle, the dimming zones 24 of the backlight arrangement 21 are designed in terms of shape and size such that they deviate from a typical, purely rectangular field arrangement in accordance with a warping function to be applied. The dimming zones 24 are consequently distributed below the display image A, which is likewise distorted according to the warping function.

That means that the otherwise rectangular individual dimming zones are distorted according to the warping function which is based on the curvature of the windshield 5 and the angle between the windshield 5 and the display surface of the LCD display unit 2.

Figure 5:
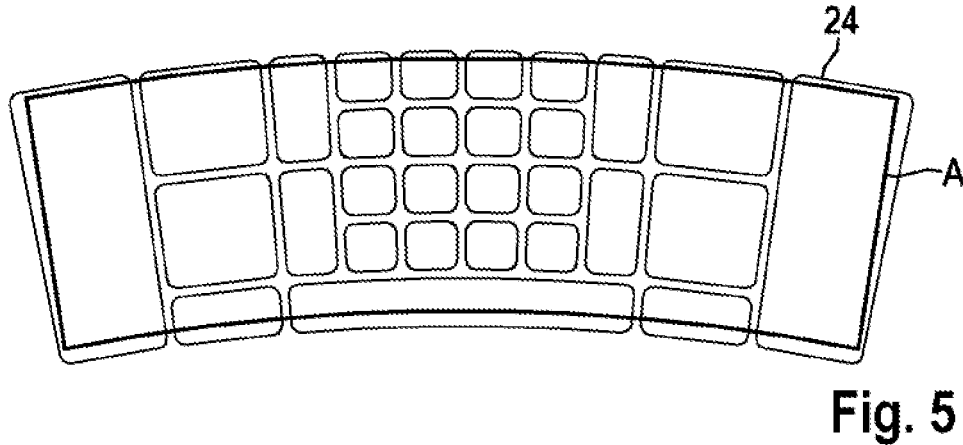
FIG. 5 shows an exemplary illustration of a backlight arrangement with dimming zones of different sizes.

As shown in FIG. 5, the dimming zones 24 can be designed in different sizes depending on the frequencies of the image points to be presented thereby in the individual regions of the dimming zones 24. It can be seen that display contents are presented more frequently in the central region of the display surface than at the peripheral regions. For this reason, the dimming zones 24 are greater at the peripheral regions than in the central region.

Figure 6:
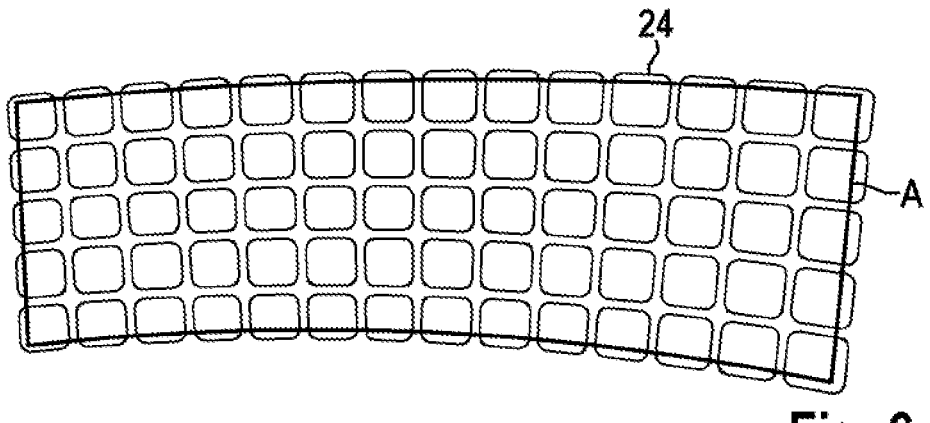
FIG. 6 shows a segmentation of the backlight arrangement adapted to a windshield of variable curvature, resulting in an asymmetric arrangement of the dimming zones.

FIG. 6 shows a segmentation of the backlight arrangement 21 which has been adapted to a windshield 5 of variable curvature such that an asymmetric arrangement of the dimming zones 24 is produced.

The dimming zones 24 which have been adapted according to the warping function are advantageous in particular if the display images to be presented are optimized accordingly for the display with corresponding non-distorted dimming zones. If the displays are preferably generated such that the non-distorted display image can be lit with as few dimming zones 24 as possible, this is possible in the LCD display unit 2 according to embodiments of the present invention even with the distorted display image because the dimming zones 24 have an identical distortion.

LIST OF REFERENCE SIGNS

1 Reflection display system
2 Display unit
3 Display surface
4 Instrument panel
5 Windshield
6 Recess
9 Control unit
21 Backlight arrangement
22 LCD pixel matrix
23 Collimation optical layer
24 Dimming zones
R Reflection region
B Eye region

What is claimed is:

1. A liquid crystal display (LCD) display unit for a reflection display system in a motor vehicle, the LCD display unit comprising:

an LCD pixel matrix for selectively controlling image points for presenting a display image on a display surface;

a backlight arrangement, which is divided into selectively controllable dimming zones in order to light regions having a plurality of image points with backlight; and a control unit, which is configured to control the LCD pixel matrix such that the display image that is output is distorted via a warping function in order to compensate for a distortion of the display image due to reflection at a reflection region, wherein the dimming zones have a shape and a size that are determined by the warping function, and wherein the dimming zones have different sizes that depend on respective frequencies of image points to be presented by the respective dimming zones.

2. The LCD display unit according to claim 1, wherein the dimming zones are formed such that the dimming zones adjoin one another, with a result that the display surface of the LCD pixel matrix on which the display image is to be presented is fully lightable.

3. The LCD display unit according to claim 1, wherein a shape of each of the dimming zones is distorted via the warping function proceeding from a rectangular shape of a display region that is to be backlit so as to be rectangular.

4. The LCD display unit according to claim 1, wherein a shape of each of the dimming zones is distorted via the warping function proceeding from rectangular shapes of display regions that are to be backlit so as to be rectangular of different sizes.

5. The LCD display unit according to claim 1, wherein each of the dimming zones of the backlight arrangement has an area and distribution that depend on display images to be displayed.

6. The LCD display unit according to claim 5, wherein the display images to be displayed are aligned with at least one of a horizontal or a vertical axis of the display surface.

7. The LCD display unit according to claim 6, wherein the display images to be displayed are formed as symbols or rectangular display fields which are selectively displayable.

8. The LCD display unit according to claim 1, wherein a collimation optical arrangement is configured to direct light from the backlight arrangement in a preferred direction.

9. The LCD display unit according to claim 1, wherein the dimming zones are configured in a shape of ring segments.

10. A reflection display system for a motor vehicle, the reflection display system comprising:

the LCD display unit according to claim 8, and a windshield with a reflection region which is curved in a surface.

* * * * *